March 10, 1942. W. H. FERGUSON 2,275,894
APPLIANCE FOR USE IN REPAIRING AUTOMOBILE BODIES
Filed March 27, 1940 4 Sheets-Sheet 1

Inventor:
William H. Ferguson
By Emery, Booth, Townsend, Miller & Whidden
Attys

March 10, 1942.   W. H. FERGUSON   2,275,894
APPLIANCE FOR USE IN REPAIRING AUTOMOBILE BODIES
Filed March 27, 1940   4 Sheets-Sheet 2

Inventor:
William H. Ferguson
by Emery, Booth, Townsend, Miller & Widner
Attys.

March 10, 1942.　　W. H. FERGUSON　　2,275,894
APPLIANCE FOR USE IN REPAIRING AUTOMOBILE BODIES
Filed March 27, 1940　　4 Sheets-Sheet 3

Inventor:
William H. Ferguson
by Emery, Booth, Townsend, Miller & Weidner
Attys.

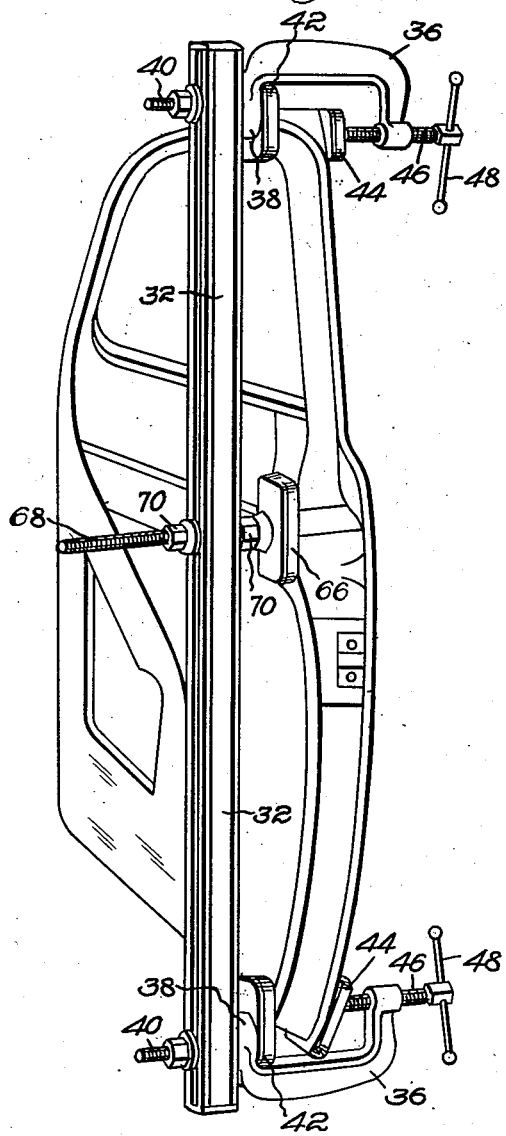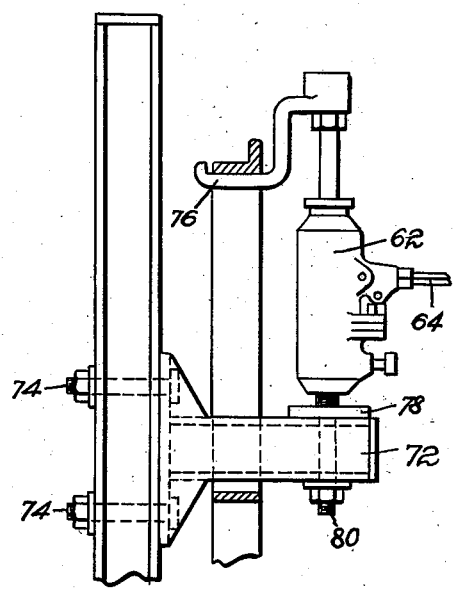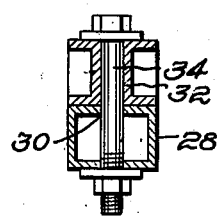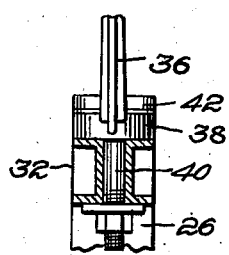

Patented Mar. 10, 1942

2,275,894

UNITED STATES PATENT OFFICE 2,275,894

APPLIANCE FOR USE IN REPAIRING AUTOMOBILE BODIES

William H. Ferguson, Flint, Mich.

Application March 27, 1940, Serial No. 326,299

6 Claims. (Cl. 29—89)

This invention relates to appliances useful in the repairing of automobile bodies, and the object is to provide an appliance particularly adaptable for repairing and refinishing operations on automobile doors and also for facilitating various other operations which are performed on automobile bodies which have been dented, bent or crushed and which require restoration.

My invention will be best understood by reference to the following description taken in connection with the accompanying drawings, wherein:

Fig. 4 is a perspective showing the application of parts of the device to another repair job;

Figure 1:
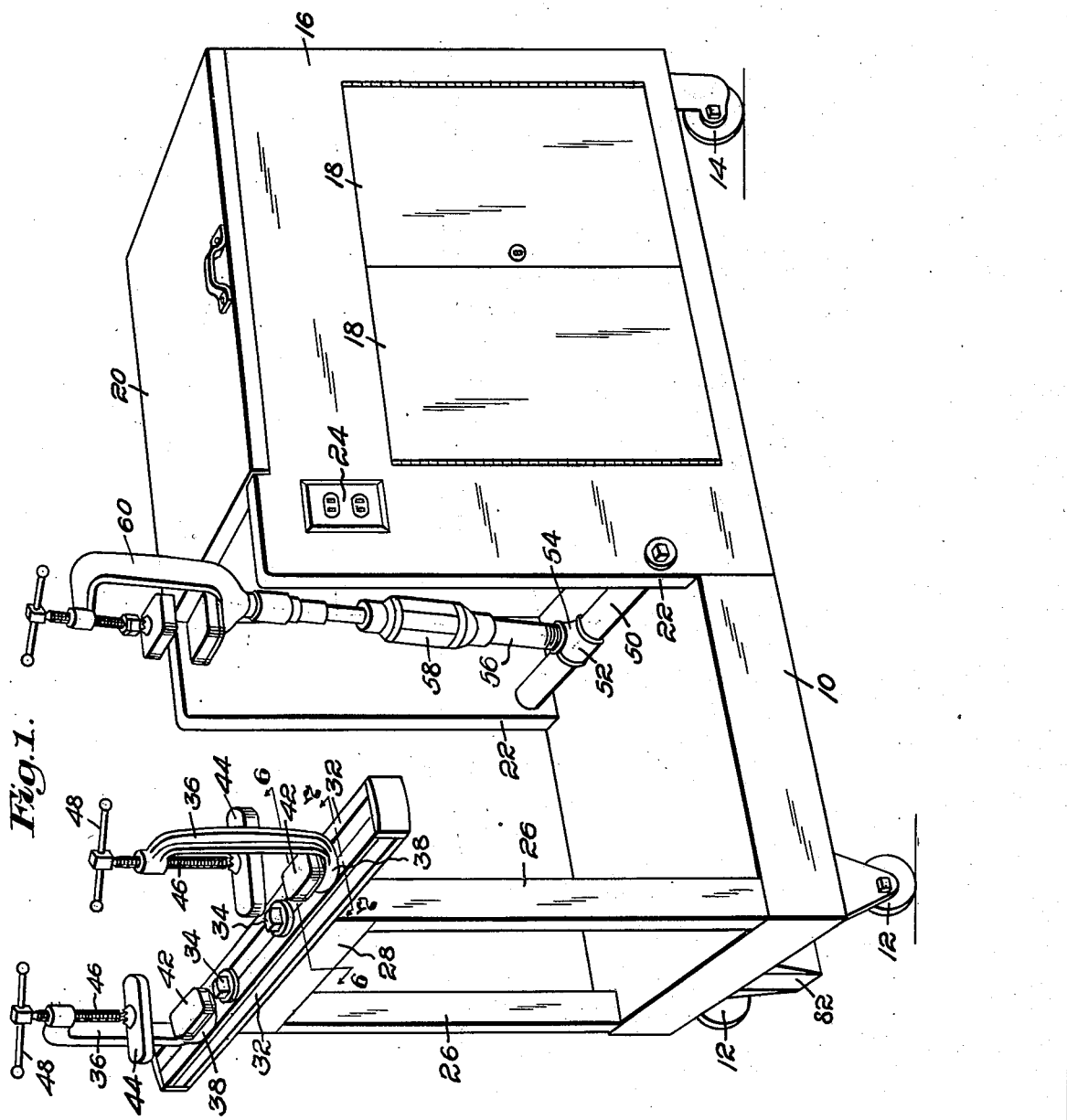
Fig. 1 is a perspective view of the appliance.

Fig. 5 is a section through the upper part of an automobile door showing another application; and Figs. 6 and 7 are sections on the lines 6—6 and 7—7 of Fig. 1 respectively.

Referring to the drawings, and first to Fig. 1, the appliance there shown comprises a base 10 of rigid construction so that it will resist the strains which are caused by the use of jacks and similar devices in the operations of bending automobile body parts to straighten the same, which base is mounted on substantial wheels to provide an ambulatory structure, fixed wheels 12 being shown at the left-hand end viewing the figures and caster wheels 14 at the right-hand end.

From one end of the base rises a cabinet structure 16 which, as shown, includes a cupboard closed by the doors 18 and a tray or chest above the same having a lid 20. This structure is adapted to receive various of the demountable parts and also other appliances and tools commonly utilized in body repair work so that the device, besides subserving its own specific functions, provides a convenient storage cabinet and permits the various tools and appliances to be conveniently brought to the job and handled there. The cabinet structure and the load of tools which ordinarily would be received therein also provide a counterweighting mass assuring stability of the appliance when utilized for supporting work in an overhanging position, as will be described.

Figure 2:
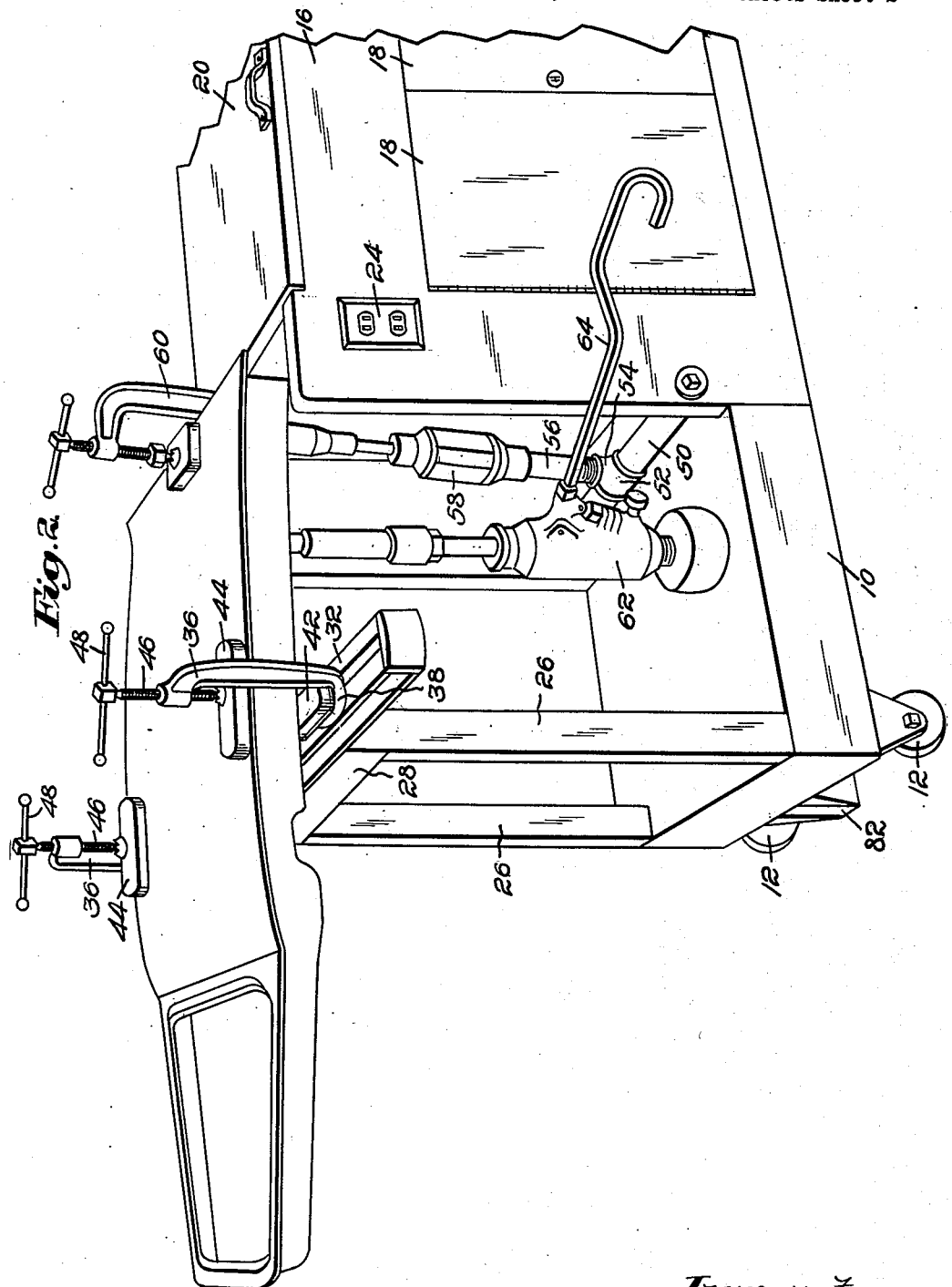
Fig. 2 is a similar view showing it in use for straightening the lower panel of a door.
Figure 3:
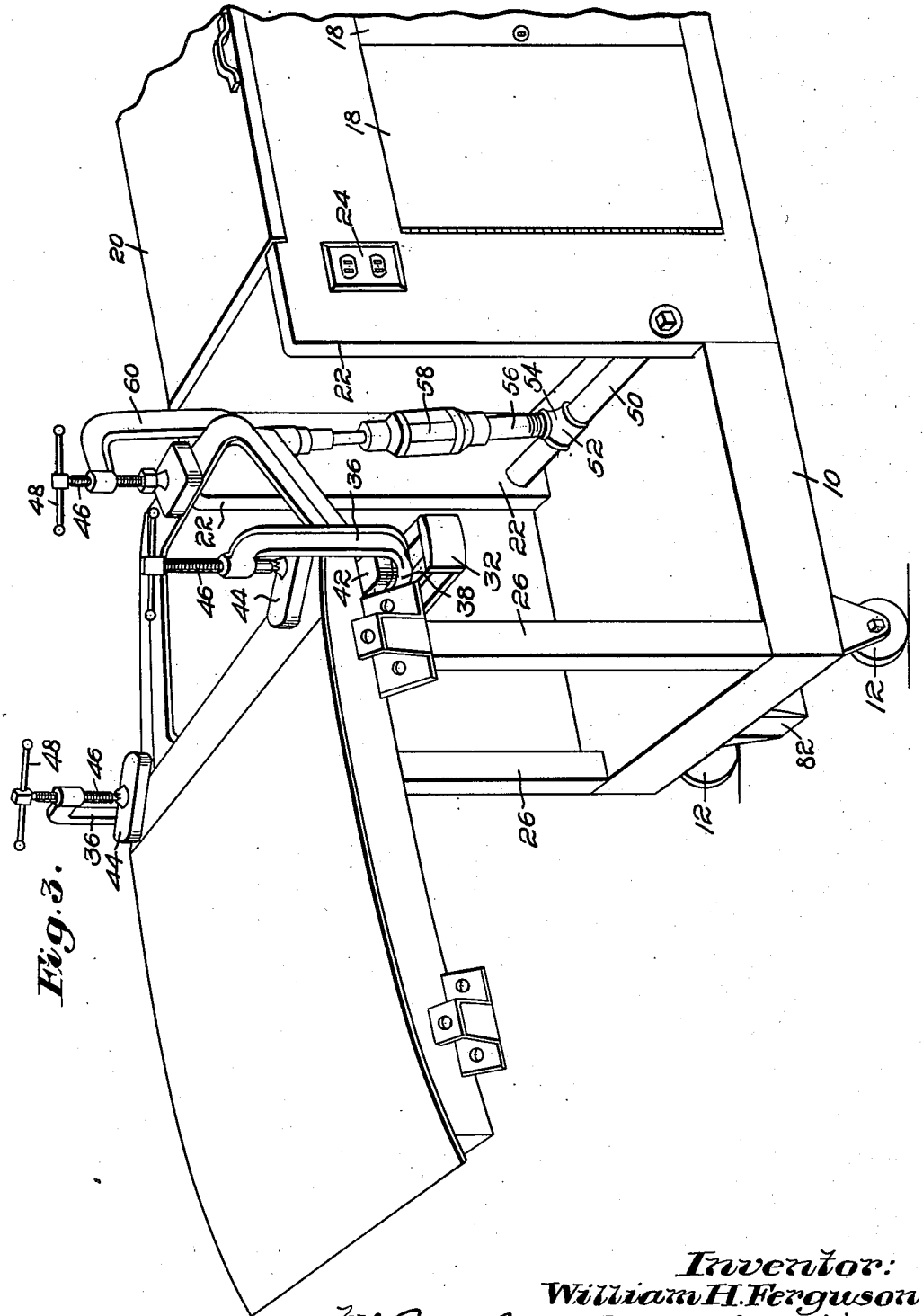
Fig. 3 is a similar view showing the door held in another position.

The left-hand end of the cabinet structure, viewing Figs. 1 to 3, comprises hollow posts 22 projecting at either side from the end walls of the cupboard and chest containers and thus providing convenient panel surfaces in which may be installed electric outlets, such as 24, for appliances and lights, the ambulatory unit being adapted to be connected by a suitable flexible connection to a power line, thus providing for the plugging into the outlets on the unit of various power tools without the embarrassment sometimes encountered by the presence of several long connecting cords run more or less at random to outlets on a shop wall or the like. The hollow posts, furthermore, provide a substantial support for the shaft 50 hereinafter to be described.

The base extends to the left in Figs. 1 to 3 beyond the cabinet structure and the posts just described to provide a rigid platform. At the extremity of this platform arises a standard here shown as comprising corner posts 26 connected by an elevated cross-bar 28 which preferably, as best seen in Fig. 6, may comprise two channels facing one another in spaced relation, the construction providing a vertical rigidity for the cross-bar as a whole and defining a through slot 30 therein for purposes which will appear. A rigid beam 32 of a length which may substantially exceed the width of the base may be demountably secured on this cross-bar. Herein this beam is shown (see Fig. 6) as formed of two heavy channels disposed with their backs opposing each other in spaced relation and secured at their ends so as to define a central slot throughout the length thereof. The beam may be secured in position on the cross-bar 28 by bolts 34 traversing the slot therein and that in the bar.

Suitable clamping devices cooperating with the beam are adjustably mounted thereon. Herein these take the form of C clamps 36 having enlarged bases 38 projecting adjacent the fixed jaws thereof to seat on the beam and from which project bolts 40 which extend through the slot of the beam and permit the clamps to be secured by nuts, the bases then resisting any tilting movement of the clamps. The fixed jaws 42 of the clamps are thus disposed adjacent the top of the beam and are provided with heavy facings of sponge rubber. Opposing them are the movable jaws 44 similarly faced and swivelled on the screws 46 operable by tommies 48.

The platform extends unobstructed at either side between the standard at the left in the figures and the cabinet structure at the right, and this distance may correspond roughly to the maximum distance from the belt line to the roof side rail as encountered in ordinary automobile practice. Adjacent the platform near the cabinet and herein mounted in the posts 22 is a shaft 50 on which a sleeve 52 may slide and turn. The sleeve may be similar exteriorly to the usual pipe T fitting and has the threaded branch 54 for detachably receiving the lower end of a leg 56. This leg is adjustable as to length by any suitable means, as, for example, oppositely acting, normally tilted, binding rings received in the housing 58 and adapted to be manually released when adjustment is desired but which normally position the parts of the leg to take either compressive or extension strains. The upper part of the leg is fitted with a C clamp 60 similar to those utilized in connection with the beam 32.

In Fig. 2 a characteristic use of the device in connection with the reconditioning of the lower panel of a damaged automobile door is shown. The door is placed with its inner side opposing the platform and it may be secured adjacent the belt by the clamps 36 which may be adjusted in or out to suit and rotated about their securing bolts 40. The lower edge is positioned by the clamp 60 on the end of the leg 56 and it will be noted that this may be slid parallel to the beam and swung toward and from the same and positioned vertically to engage the edge of the door in any desired position. With the door thus positioned, a jack 62 of any ordinary type, here illustrated as of the hydraulic type operable by the hand lever 64 and fitted with a spoon head of the proper construction for the work in hand, may be inserted through the unobstructed spaces between the cabinet and the end standard and the head inserted through the openings in the inner face of the door against the bent portion of the panel and the jack operated to press the panel outwardly or upwardly, viewing the figures, from the fixed point of support provided by the platform.

In Fig. 3 I have shown a door supported by being clamped on the beam 32 adjacent the belt portion thereof and with the top header bar secured by the clamp 60 at the end of the adjustable leg. The lower panel of the door is thus supported in overhanging relation from the lefthand end of the appliance and a mechanic will have free unobstructed access to the lower door panel to work through the openings of the inner construction to perform the metal finishing or hand hammering operations which may be necessary or to file or buff the outer surface of the panel, as, for instance, by means of motor driven tools connected to one of the outlets on the post 22.

In cases where the outer door panel cannot be repaired but is to be replaced, the mechanism used is useful to position and press into place the new outer panel substantially as illustrated in Fig. 2, holding it in its correct alignment while it is being welded and assembled to the inner construction.

The door or other structure obviously may be clamped in varied positions on account of the adjustability of the clamps 36 on the beam 32 and of the beam on the cross-bar 28 of the standard. Other push and pull tools may also be used in connection with the rigid point of support furnished by the beam, the slot in the latter permitting their attachment thereto. This is illustrated in Fig. 4, which also shows that the beam, being demountable, may be used separately in many situations wherein a rigid base for pushing and pulling tools is desired. In that figure I show a door which may be supposed to be on its hinges in an automobile body, with the beam extending vertically along the inner surface thereof adjacent the lock pillar and held in position by one clamp 36 set up against the lower edge of the panel while the other clamp 36 engages the top header. A padded block 66 mounted on a threaded shank 68 may have the latter applied through the slot of the beam at a central portion thereof so that it bears against the central portion of the door, and I have herein illustrated nuts 70 on the shank at either side of the beam. Such a device may be utilized to immobilize the lower portion of the door while pressure is applied to the upper portion thereof by the clamp 36 utilized as a screw jack or, by backing off the nut 70 on the right-hand face of the beam, viewing Fig. 3, a push toward the right may be exerted against the door in the region of the belt.

The beam also serves as a rigid column for aid in securing pressure in lines parallel thereto. Thus in Fig. 5 I have illustrated a rigid post 72 having a base fitting the beam through which base pass bolts 74 which may extend through the slot in the beam so that the post may be secured in desired position along the length of the beam. In Fig. 5 the post is shown fitted in position to project through the window opening of a door and form a horizontal base to support a suitable jack for operating on the top header bar to bend the same upwardly. The usual commercial jacks, such, for instance, as that illustrated in Fig. 2, are usually of greater height than the ordinary door window opening, and in Fig. 5 I have shown the jack as fitted with a depending hook-like head 76 to engage the top header bar. Conveniently the padded base which is illustrated in Fig. 2 is exchanged for a flat base 78 to rest on the post 72 and the post is conveniently of slotted construction to accommodate a threaded shank 80 extending from such a base to hold the jack against tipping movement. The beam in Fig. 5 may be considered as resting on the floor and might be positioned relatively to the door by one of the clamps 36 applied to the lower edge of the door.

When the appliance is not in active use, the clamps 36 of the beam may be removed and the leg 56 detached from the sleeve 52 and these portions stored in the cabinet structure. I have herein shown a cradle 82 beneath the platform in which the beam 32 may be stored.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. A device for positioning automobile body parts while they are being worked upon comprising a base adapted to support strain, a standard arising at one end thereof, a rigid transverse beam supported by the standard having edge-receiving clamps, means adjustably mounting the clamps for sliding movement along the beam, and an adjustably movable positioning element at the opposite end of the base having clamping means providing in cooperation with the clamps of the beam for positioning a door or the like by three point suspension in opposition to the base, said base having a strain-supporting surface of substantial area and of sufficient rigidity to sustain the reaction of a tool that is adapted to be applied at selected locations between the base and the supported door or the like.

2. A device for positioning automobile body parts while they are being worked upon comprising a base adapted to support strain, a standard arising at one end thereof, a rigid transverse beam supported by the standard having edge-receiving clamps, means adjustably mounting the clamps for sliding movement along the beam, a transverse member adjacent the opposite end of the base, a leg slidably and pivotally mounted on said member and adjustable in length, said member carrying a clamp at the upper end thereof, said base having a strain-supporting surface of substantial area and of sufficient rigidity to sustain the reaction of a tool that is adapted to be applied at selected locations between the base and the supported door or the like.

3. A device for positioning automobile body parts while they are being worked upon comprising a base adapted to support strain, posts arising adjacent the corners at one end thereof, the sides of the base for a considerable distance from said posts being unobstructed, a cross member between the upper ends of the posts, a rigid beam longer than said cross member adapted to be secured therealong, clamping members, means slidably associating the same with the ends of the beam, the clamping members having jaws opposing the beam and adjustable toward and from the same, and a clamping member adjustable toward and from the beam, toward and from the base and parallel to the beam for selective location in substantially the plane of the beam to position in cooperation with the clamps of the beam a piece of work in opposition to the aforesaid unobstructed portion of the base, said base having a strain-supporting surface of substantial area and of sufficient rigidity to sustain the reaction of a tool that is adapted to be applied at selected locations between the base and the supported door or the like.

4. A device for positioning automobile body parts while they are being worked upon comprising a base adapted to support strain, posts arising adjacent the corners at one end thereof, the sides of the base for a considerable distance from said posts being unobstructed, a cross member between the upper ends of the posts, a rigid beam longer than said cross member adapted to be secured therealong, clamping members, means slidably associating the same with the ends of the beam, the clamping members having jaws opposing the beam and adjustable toward and from the same, a bar extending across the base at a considerable distance from the posts, a sleeve rotatable on and slidable along the bar, a leg detachably secured to said sleeve having means for adjusting the length thereof and a clamping element at the end of the leg, said base having a strain-supporting surface of substantial area and of sufficient rigidity to sustain the reaction of a tool that is adapted to be applied at selected locations between the base and the supported door or the like.

5. A device for positioning automobile body parts while they are being worked upon comprising a structure including at one end thereof a low base having a strain-supporting surface of substantial area and of sufficient rigidity to sustain the reaction of a tool that is adapted to be applied at selected locations between the base and a body part supported above the base, the space vertically above said surface being substantially unobstructed, means for so supporting a body part comprising a standard arising at one end of the base including a cross member, a longitudinally slotted, rigid beam adapted to rest on the member, means for adjustably securing together the member and superposed beam providing for a multiplicity of relative positions thereof, clamping members, means extending through the slot of the beam for adjustably mounting the members on the beam for sliding movement along the same, and a cooperating clamp member mounted for positioning at the other end of said surface at substantially the elevation of said beam, the center of gravity of the structure as a whole being relatively remote from that end bearing the standard to provide for supporting loads in overhanging relation thereto.

6. A device for positioning automobile body parts while they are being worked upon comprising a base adapted to support strain, a standard at one end thereof comprising at its upper end a transverse member slotted along its length, a rigid beam longer than said member also slotted along its length, means passing through the slots of the cross member and beam for adjustably securing them together, edge-receiving clamps, means adjustably mounting the clamps for sliding movement along the beam, and an adjustably movable positioning element at the opposite end of the base having clamping means providing in cooperation with the clamps of the beam for positioning a door or the like by three point suspension in opposition to the base, said base having a strain-supporting surface of substantial area and of sufficient rigidity to sustain the reaction of a tool that is adapted to be applied at selected locations between the base and the supported door or the like.

WILLIAM H. FERGUSON.